United States Patent
Edic et al.

(10) Patent No.: US 6,408,049 B1
(45) Date of Patent: Jun. 18, 2002

(54) APPARATUS, METHODS, AND COMPUTER PROGRAMS FOR ESTIMATING AND CORRECTING SCATTER IN DIGITAL RADIOGRAPHIC AND TOMOGRAPHIC IMAGING

(75) Inventors: Peter Michael Edic, Albany; Ahmad Nadeem Ishaque, Clifton Park, both of NY (US)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 09/585,786

(22) Filed: Jun. 5, 2000

Related U.S. Application Data

(60) Provisional application No. 60/164,377, filed on Nov. 9, 1999.

(51) Int. Cl.[7] .................................................. H05G 1/64
(52) U.S. Cl. .................................. 378/98.12; 378/98.11
(58) Field of Search ........................... 378/98.12, 98.11, 378/98.4, 147, 154

(56) References Cited

U.S. PATENT DOCUMENTS

| | | | |
|---|---|---|---|
| 5,327,476 A | * 7/1994 | Kemner | 378/98.4 |
| 5,825,032 A | * 10/1998 | Nonaka et al. | 250/370.09 |
| 6,041,132 A | * 3/2000 | Isaacs et al. | 382/100 |
| 6,072,855 A | * 6/2000 | Arakawa | 378/98.11 |
| 6,134,297 A | * 10/2000 | Chao | 378/98.12 |
| 6,157,700 A | * 12/2000 | Sako | 378/98.12 |

FOREIGN PATENT DOCUMENTS

EP        0782375      7/1997    ............ H05G/1/60

OTHER PUBLICATIONS

"Measurements of Scatter Fractions in Clinical Bedside Radiography", by C. E. Floyd, Jr et al., Radiology 1992, 183:857–861.
Principles of Computerized tomographic Imaging, by Avinash C. Kak & Malcolm Slaney, IEEE Press, pp. 126–133, 1988.

* cited by examiner

*Primary Examiner*—Robert H. Kim
*Assistant Examiner*—Irakli Kiknadze
(74) *Attorney, Agent, or Firm*—Donald S. Ingraham; Christian G. Cabou

(57) ABSTRACT

An x-ray imaging system images an object by transmitting primary signals and includes a collimator placed between detectors of the x-ray imaging system. The collimator reduces respective scatter components of total signals including a primary signal component and a scatter signal component. One of the detectors detects the total signals, the collimator collimates the primary signals of the total signals focally aligned with the collimator and traveling through the one of the detectors, another of the detectors detects the collimated, primary signals. The x-ray imaging system reduces the scatter components of the total signals detected by the one of the detectors based on the detected, collimated signals and the corresponding, detected, total signals. In another aspect, a detector includes regions of reduced absorption.

30 Claims, 12 Drawing Sheets

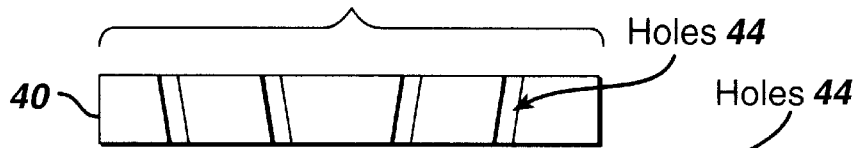
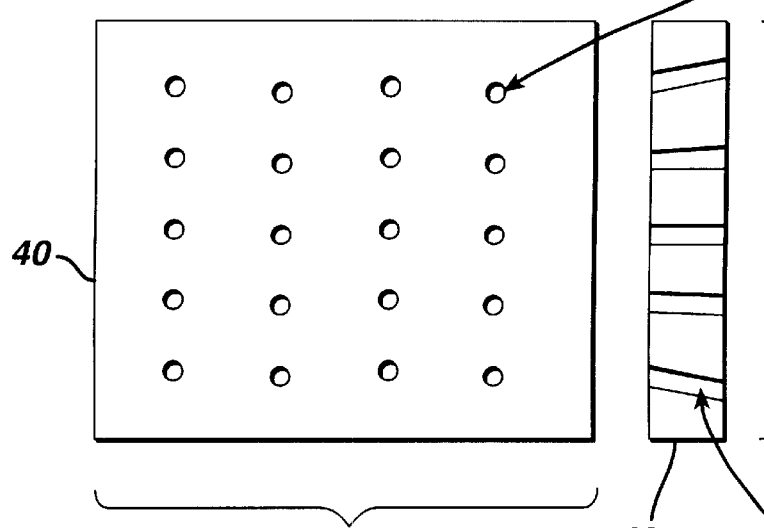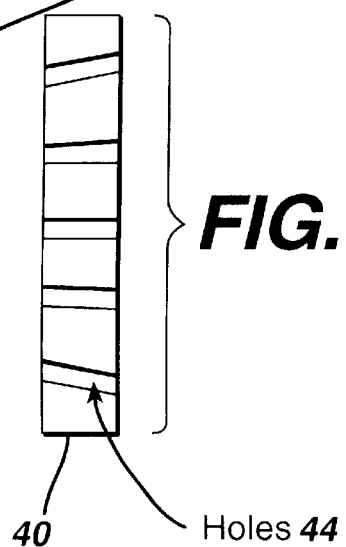
FIG. 7B
FIG. 7C
FIG. 7A

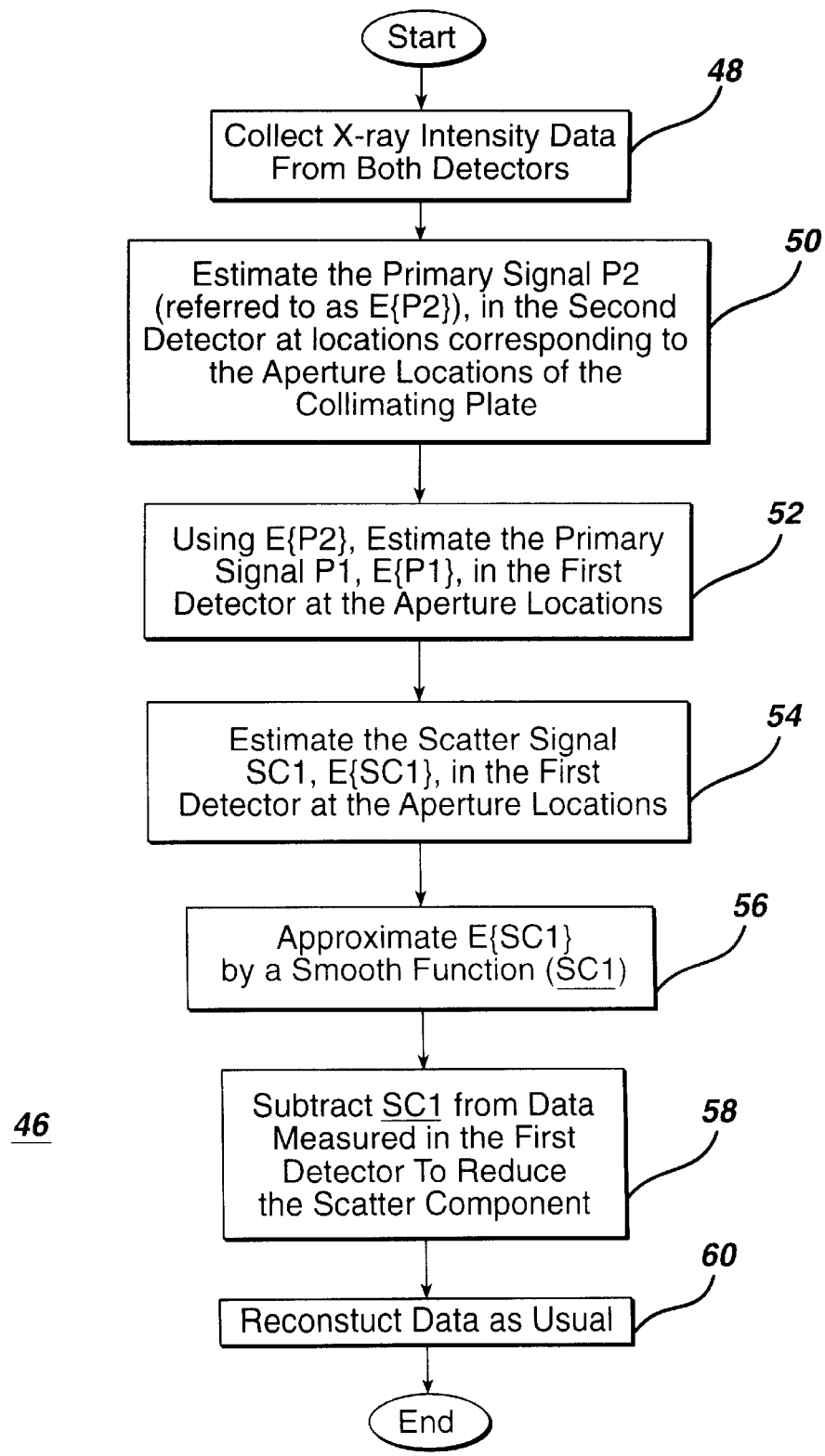
Flowchart for Scatter Correction Method

Sample 2D Phantom

2D Detector Array *38*

*70*

% Absorption in the Detector Scintillator

Horizontal Distance in Panel (mm) 38

APPARATUS, METHODS, AND COMPUTER PROGRAMS FOR ESTIMATING AND CORRECTING SCATTER IN DIGITAL RADIOGRAPHIC AND TOMOGRAPHIC IMAGING

CROSS REFERENCE TO RELATED APPLICATIONS

This application is related to Provisional Application U.S. Ser. No. 60/164,377, filed Nov. 9, 1999 in the U.S. Patent and Trademark Office, the contents of which are incorporated herein by reference, and the benefit of priority to which is claimed under 35 U.S.C. 119(e).

BACKGROUND OF THE INVENTION

The present invention relates generally to radiographic and tomographic imaging, and, more particularly, to estimating and reducing scatter in digital radiographic and tomographic imaging and to an improved digital X-ray detector used for same.

A typical prior art radiographic or computed tomography (CT) imaging system 10 of the so-called third generation is shown in FIG. 1. Imaging systems of the type disclosed in FIG. 1 are described in further detail in Principles of Computerized Tomographic Imaging, by Avinash C. Kak & Malcolm Slaney, IEEE Press, 1988. As shown in FIG. 1, the imaging system 10 includes a source 12, such as an x-ray source, transmitting primary signals to an object 14, such as a patient, positioned on a support 16, such as a table. Some of the primary signals pass through the object 14 and the support 16, and are detected by detector array 18. Detection of the primary signals by detector array 18 is controlled by data acquisition component 19.

A characteristic of a third-generation CT imaging system is that the source 12 and the detector array 18 containing collimating plates are focally aligned with each other and are both controlled by a common controller 20 to move in tandem with each other while maintaining their established focal alignment. Focal alignment means that the collimating plates of the detector array 18 point toward the source 12. The controller 20 typically controls on/off states and motion of the source 12 and the detector array 18, based upon instructions issued by the CT system computer 22. The CT system computer 22 also controls the data acquisition component 19.

Once the x-ray signals are detected, data acquisition component 19 converts the detected signals into digital data supplied to the CT system computer 22. The CT system computer 22 then processes according to well-known techniques the digital data, stores the processed digital data in system memory 24, and displays the processed digital data on display 26.

When high-resolution digital area detectors are used in radiographic and tomographic imaging applications, one concern that commonly arises is the problem of scatter corruption of the primary signal. Scatter, or scatter corruption, reduces low-contrast detectability and resolution in both radiographic images and reconstructed tomographic images. Further, scatter signals can cause streaks between highly attenuating objects in reconstructed tomographic images, thus masking the shape of the objects 14. Unlike with lower resolution linear detectors, it is impossible to collimate appropriately each detector element in an area detector since the dimension of individual detector elements can be an order of magnitude smaller than their linear detector counterparts. As a result, it is necessary to devise methods or schemes to either reduce scatter or correct for scatter.

An approach of the prior art in the field of radiography has been to use a collimating grid positioned over the detector. Although this grid covers part of the detector, it is continuously moved during the x-ray exposure interval so as not to produce discernible artifacts.

Another approach offered in the prior art has been to estimate scatter in regions of the imager that are not shadowed by the patient. A constant value of scatter is then subtracted from all pixels in the image. Although this approach has some benefit for radiographic applications, it usually produces severe artifacts in tomographic applications. In general, using area detectors for tomographic applications is a fairly new technology; hence, no standard methods to reduce/correct scatter have been devised. As used herein, "area detectors" generally refer to detectors having rows and columns of pixels that are connected together to provide readout by rows and columns of the pixels in the array, and typically implies a large number (e.g., more than 5 rows, and commonly an array of a size 1000×1000 pixels or detector elements) of pixels in the array; multi-row detectors typically refer to a small number (e.g., 5 or less) pixel rows that are arranged to provide an imaging signal, and a "single row" detector refers to one row of pixels disposed to provide the imaging signal.

In most x-ray imaging systems using area detectors, the x-ray detector that is used to measure the intensity of the x-ray beam, or primary signal, that remains after passing through the object (or patient) does not completely absorb the remaining x-ray flux from the x-ray beam. As a result, a slab of attenuating material called a beam-stop 28 is usually placed directly behind the detector 18 panel, as shown in FIG. 2. The use of a beam-stop 28 is discussed in "Measurement of Scatter Fractions in Clinical Bedside Radiography," Radiology 1992, 183:857–861. The slab of attenuating material (or beam-stop) 28 is usually made from an x-ray absorbing material such as lead or tungsten and is used to reduce the residual x-ray intensity that is not detected by the area detector 18 to a near zero value. Since a part of the x-ray flux is not absorbed by the area detector 18, some of the dose applied to the patient 14 is not used for diagnostic purposes, a health concern for radiologists.

Since x-ray scatter, resulting from the interaction of the primary x-ray beam P1 (as shown in FIG. 2) with the object 14 within the imaging system 10, may be a significant fraction of the detected x-ray signal in the area detector 18, a method and apparatus for estimating and reducing the scatter signal would be useful. If x-ray data collected contain a significant amount of scatter, computed tomography (or CT) reconstructions of the object will contain noticeable artifacts that will limit their utility for diagnostic purposes.

It is known in the art that hardware collimation significantly reduces the scatter signal measured with linear detector arrays 18. A detector array 18 comprises cells 30. In general, for these types of detector arrays 18 in a third-generation CT imaging machine 10, each cell 30 of the detector array 18 includes individual detector elements 18-n and may also include collimator plates 32 as shown in FIG. 3. A typical area detector array 18 shown in FIGS. 1–3 includes, for example, 1K×1K (1,024×1,024) of detector elements 18-n or cells 30 detecting the x-ray beam. In the detector cell 30 shown in FIG. 3, collimator plates 32 are included. However, collimator plates 32 are not necessarily included in other detector cells 30 of area detector arrays 18. As shown in FIG. 3, a collimator plate 32, made of thin lead or tungsten and which is focally aligned to the x-ray source 12, is placed between each detector element 18-n in detector array 18; these plates 32 attenuate the scatter signal while allowing the primary signal to be detected as desired. The dimensions of the collimator plates 32 affect the amount of scatter that is rejected by the imaging geometry of the imaging system 10. For area detector technology, it is not possible to collimate each detector element 18-n (also referred to as cell 30) in area detector array 18 because of increased resolution of individual detector elements 18-n or cells 30 used in area detector array 18. The thickness of the collimator plates 32 required to appropriately attenuate the scattered radiation would be such that the plates 32 would cover most, if not all, of the active area of the individual detector elements 18-n or cells 30 in area detector array 18. Therefore, other methods are needed to appropriately characterize and correct for scatter.

BRIEF SUMMARY OF THE INVENTION

The present invention provides an x-ray imaging system and method which images an object by transmitting primary signals through the object. In the present invention, a collimator is placed between two detectors of the x-ray imaging system. The collimator reduces respective scatter components of total signals measured in one of the detectors; the total signals comprise a transmitted primary component and a scattered signal component. More particularly, a first detector detects the total signals, the collimator collimates the primary signals of the total signals focally aligned with the collimator and traveling through the first detector, and a second detector detects the collimated, primary signals. The x-ray imaging system reduces the scatter components of the total signals detected by the first detector based on the detected, collimated signals detected by the second detector and the corresponding, detected, total signals detected by the first detector.

The present invention also provides a scatter estimation and reduction method of an x-ray imaging system transmitting primary signals detected by one of the detectors of the x-ray imaging system. More particularly, the method of the present invention detects by a first detector total signals, then collimates, by a collimator placed between the first detector and a second detector, components of the total signals passing through the first detector, and, subsequently, detects by the second detector the collimated signals. The method of the present invention then reduces the scatter components of the total signals detected by the first detector based on the detected, collimated signals detected by the second detector and the corresponding, detected, total signals detected by the first detector.

The present invention includes a scatter estimation and reduction software program executed by a processor and implementing the above-mentioned method of the present invention.

BRIEF DESCRIPTION OF THE DRAWINGS

FIGS. 7A, 7B, and 7C show a collimator 40 of the present invention.

FIG. 8 shows a flowchart of a scatter correction method of the present invention.

DETAILED DESCRIPTION OF THE INVENTION

The present invention is an apparatus and method estimating a scatter signal over an entire detector and providing algorithmic correction of the scatter signal on a view-by-view basis for exposures made by an imaging system. A priori information regarding patient size or pathology is unnecessary; both of these factors significantly affect the scatter signal (or component) of the x-ray intensity impinging on an area detector of the x-ray imaging system. In one aspect of the invention, the imager provides hardware and software to estimate a 2D map of a scatter signal in an area detector, allowing software correction for the scattered signal in measured data.

The x-ray imaging system of the present invention typically is an x-ray radiography or computed tomography imaging system producing images of an object. Typically, the images include scatter components; these scatter components are greatly reduced or eliminated by the x-ray radiography or computed tomography imaging system of the present invention over the images produced by prior art x-ray radiography or computed tomography imaging systems. More particularly, the present invention is an x-ray radiography or computed tomography imaging system which includes a detector/collimator/detector assembly (as used herein, "detector/collimator/detector assembly" refers to an apparatus in which a collimator is disposed between a first detector and second detector such that radiation passing from the source will pass progressively from the first detector, then the collimator, and lastly to the second detector) and a CT system computer executing software which, together, estimate and correct for scatter on a view-by-view basis for each image produced by the x-ray radiography or computed tomography imaging system.

Figure 4:
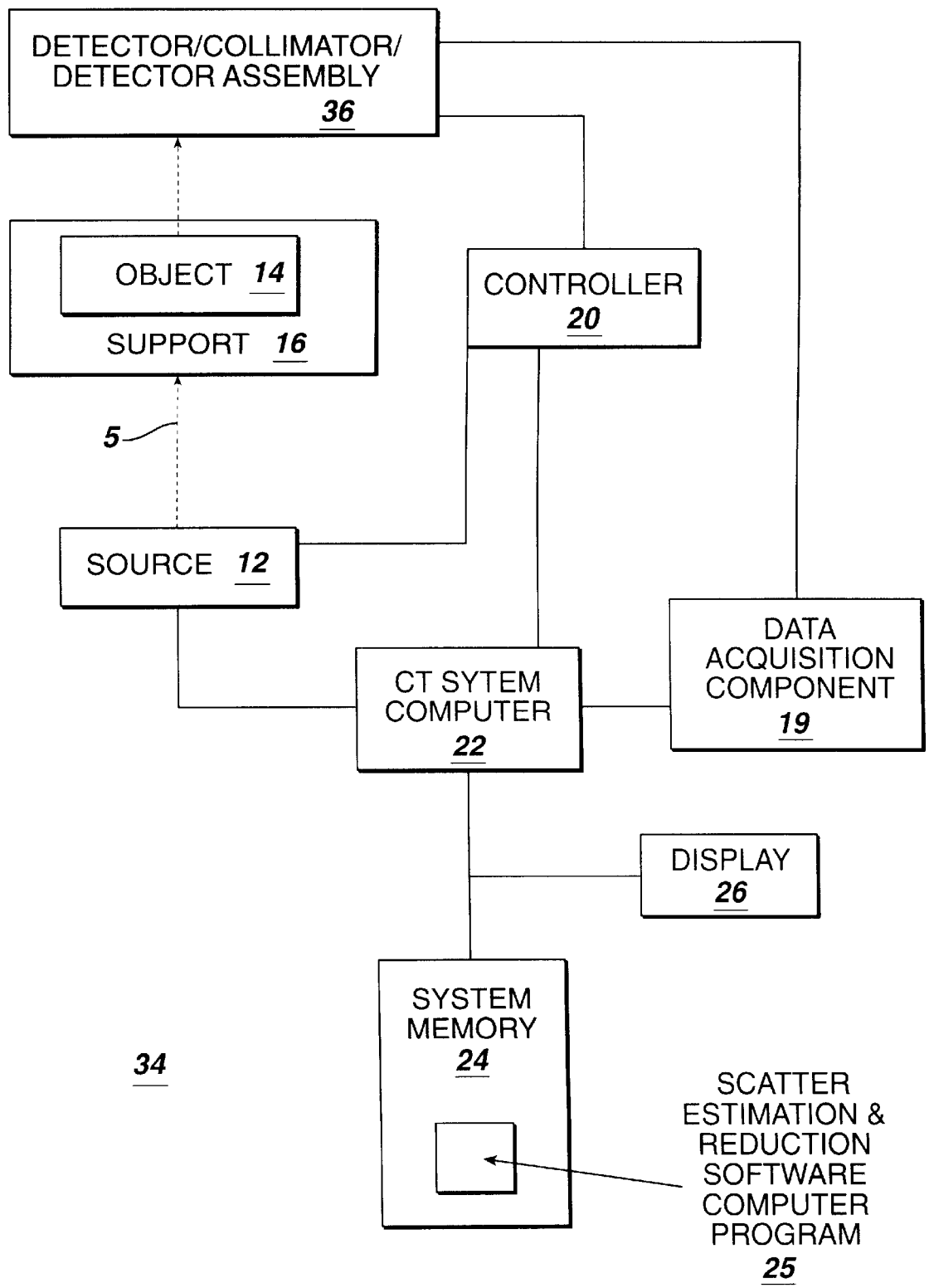
FIG. 4 shows an overview of an x-ray or computed tomography system of the present invention.

FIG. 4 shows an overview of an x-ray or computed tomography imaging system 34 of the present invention. Throughout the following explanation, the terms "x-ray imaging system", "x-ray radiography imaging system", "computed tomography imaging system", and "CT imaging system" are used interchangeably to refer to the imaging system 34 shown in FIG. 4.

Figure 1:
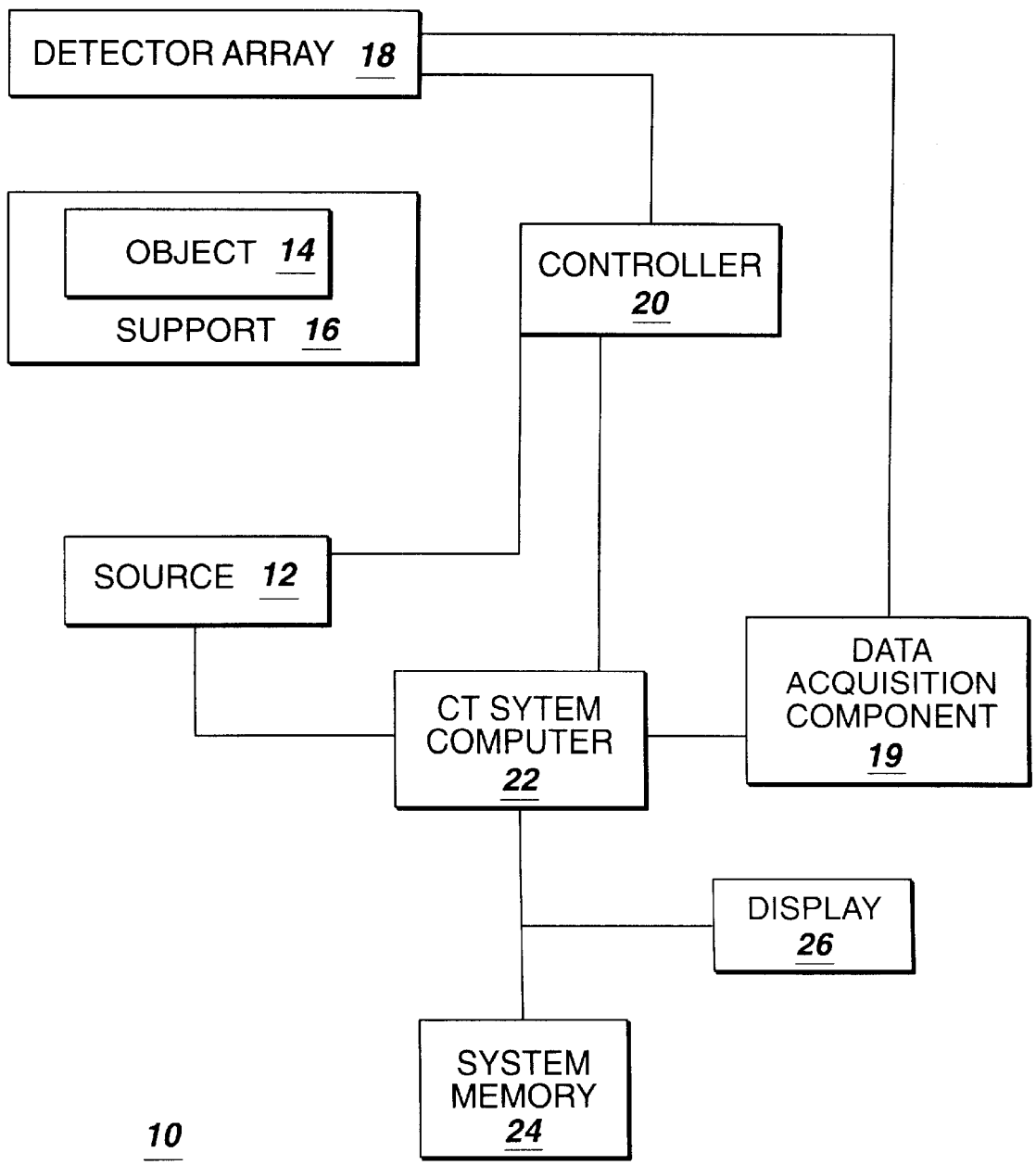
FIG. 1 shows an overview of a prior art x-ray or computed tomography imaging system.
Figure 2:
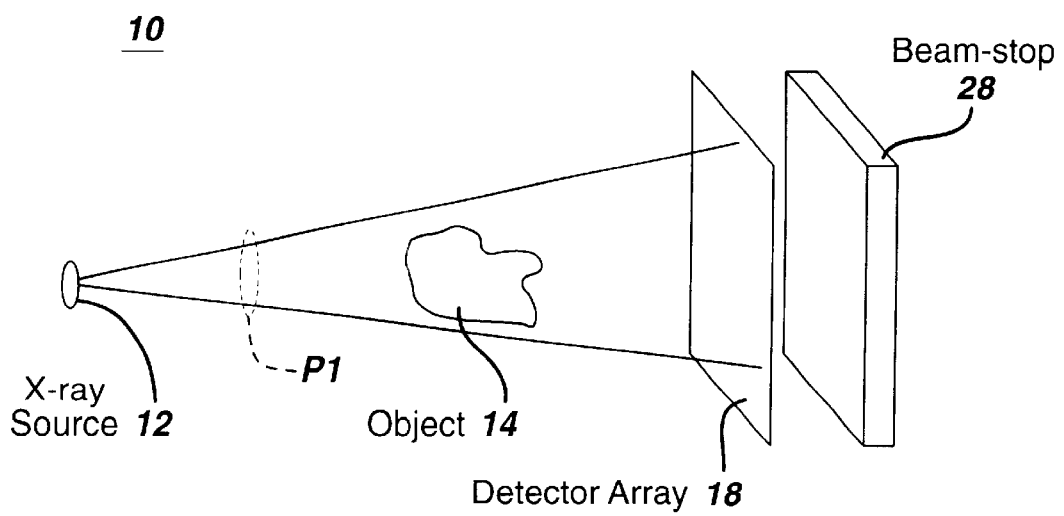
FIG. 2 shows system geometry of an x-ray or CT system using area detector technology.

In the x-ray imaging system 34 of the present invention shown in FIG. 4, like numerals refer to like parts corresponding to the x-ray imaging system 10 of the prior art shown in FIG. 1, and descriptions of those like parts are not repeated herein.

However, in contrast to the x-ray imaging system 10 of the prior art shown in FIG. 1, the x-ray imaging system 34 of the present invention shown in FIG. 4 includes a detector/collimator/detector assembly 36 of the present invention instead of the detector array 18. Moreover, the CT system computer 22 of the x-ray imaging system 34 of the present invention shown in FIG. 4 executes a scatter estimation and reduction software program 25 of the present invention which is explained in further detail herein below. The scatter estimation and reduction software program 25 of the present invention is stored in memory 24.

Referring now to the x-ray imaging system 34 of the present invention shown in FIG. 4, primary x-ray signals are transmitted by source 12 into object to be imaged 14, and through support 16 on which object 14 is placed. The intensity of the total x-ray signals passing through the object 14 and through support 16, including both primary signals and scatter signals, is measured by detector/collimator/detector assembly 36 of the present invention, and scatter components included therein are estimated and reduced or eliminated by the scatter estimation and reduction program 25 of the present invention.

The x-ray imaging system 34 of the present invention can be adapted for use with a variety of generations of CT imaging systems, such as systems that employ a variety of detector types (e.g., area, linear, or discrete detectors) as described herein. The source 12 is focally aligned with the detector/collimator/detector assembly 36. As used herein as described in more detail below, "focally aligned" refers to the orientation of collimator plates to allow passage (without impinging on the collimator) of x-rays passing along a direct (non-deflected) path to the detector surface behind the collimator. Accordingly, both of the source 12 and the detector/collimator/detector assembly 36 are controlled by the common controller 20 to move in tandem with each other while maintaining their established focal alignment with each other. Maintaining the detector/collimator/detector assembly 36 in focal alignment with the source 12 is consistent with maintaining the focal alignment between the source 12 and the detector array 18 of the prior art and would be apparent to one of ordinary skill in the art.

The controller 20 typically controls on/off states, position, orientation, and motion of the source 12 and the detector/collimator/detector assembly 36, based upon instructions issued by the CT system computer 22. Moreover, the CT system computer 22 also issues commands to the data acquisition component 19 to receive the measurements of signals (explained herein below) by detector/collimator/detector assembly 36 of the present invention.

The detector/collimator/detector assembly 36 of the present invention is explained in further detail with reference to FIGS. 5–7, and the scatter estimation and reduction program 25 of the present invention is explained in further detail beginning with reference to FIG. 8.

Figure 5:
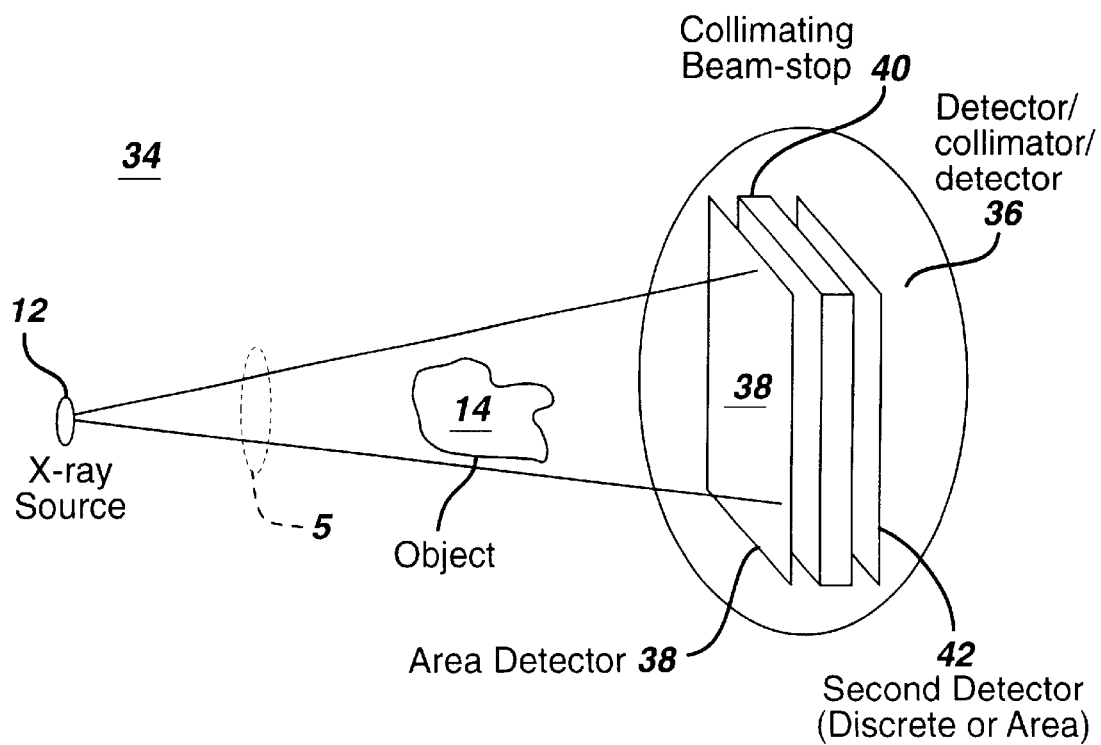
FIG. 5 shows system geometry of an x-ray or CT system of the present invention, using an area detector, a collimating beam-stop, and a secondary detector element or array.

FIG. 5 shows the system geometry of an x-ray radiography or CT imaging system 34 using the detector/collimator/detector assembly 36 of the present invention. As shown in FIG. 5, the x-ray source 12 directs the primary radiation signal toward object 14. Signals 5 (also referred to as primary radiation signal P1) penetrate and exit object 14 and continue onto the detector/collimator/detector assembly 36 of the present invention. The detector/collimator/detector assembly 36 of the present invention, which is focally aligned with the source 12, includes a first detector 38, collimator 40 and a second detector 42. First detector 38 and second detector 42 typically comprise area detectors of size (area) and pitch selected for the particular imaging application planned for imager 34. Alternatively, the second detector comprises a multi-row detector, or linear detectors (having a single row of detector elements), or a discrete detector, disposed behind passages in collimator 40. Collimator 40 is manufactured with the angular pitch of its apertures corresponding to the particular geometry of the imaging system such that the apertures are focally aligned with the source 12 so as to allow x-rays to pass on a direct path to second detector 42.

Although first detector 38 commonly is constructed using an area detector known in the art, a further embodiment of first detector 38, which is another aspect of the present invention, includes regions 70 of reduced radiation detection sensitivity (typically controlled by the amount of radiation absorbed by the detector), as explained below in further detail with reference to FIGS. 15A and 15B. Preferably, regions 70 are included in the detector 38 as described with reference to FIGS. 4–14, and are focally aligned with the source 12.

Figure 6:
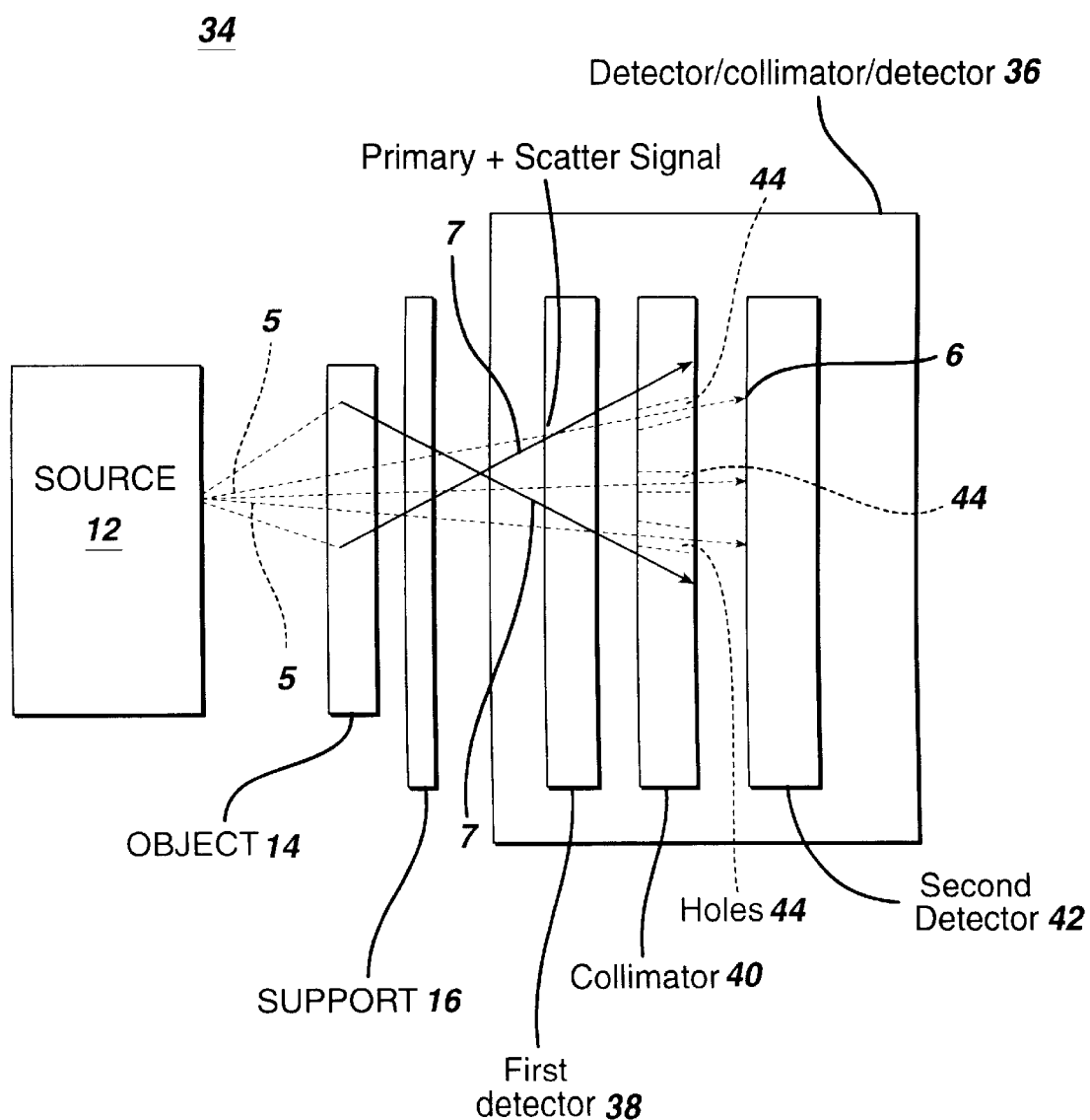
FIG. 6 shows a side view of ray paths of x-ray signals in a radiography or computed tomography system of the present invention.

FIG. 6 is a more detailed view of the geometry of the x-ray imaging system 34 of the present invention. As shown in FIG. 6, source 12 transmits x-ray signals 5 (referred to in the equations as P1) through object 14 and support 16 to the detector/collimator/detector assembly 36 of the present invention. Parts of primary signals 5 (P1) are scattered, forming scatter x-ray signal components 7 (representative scatter rays are illustrated in FIG. 6 by way of illustration and not limitation; these scatter signals are referred to in the equations herein as SC1) after striking object 14 and support 16. The total signals (including primary signal components 5 (P1) and scatter signal components 7 (SC1)) then travel to detector/collimator/detector assembly 36 of the present invention, and the first detector 38 is disposed to receive total x-ray signal (primary signal 5 (P1) and scatter signal 7 (SC1)). First detector 38 is adapted to measure total x-ray signal incident on the detector and provide electrical signals corresponding to the combined primary signal 5 (P1) and scatter components 7 (SC1). As used herein "adapted to" and the like refer to components having a structure (e.g. sensor) and a processing capability (e.g., with a programmable computer, Application Specific Integrated Circuit (ASIC), or the like) for performing a stated function.

Primary signal 5 and scatter signal 7 are attenuated during the detection process by the first detector 38 and then travel to collimator 40. Collimator 40 is constructed from radiation absorbing material, such as the same material as a beamstop, and is focally aligned with the source 12. Collimator 40 of the present invention includes holes (or apertures) 44 (a few representative apertures being illustrated in FIG. 6) which preferentially allow the primary signal 5 that has passed through the object 14, the support 16, and the first detector 38 to pass through the collimator 40. The primary signal 5 that has passed through the collimator 40 is referred to as a collimated, primary signal 5. The collimated, primary signal 5 is then detected by the second detector 42, and is referred to as a detected, collimated signal 6. The collimating plates of the collimator 40, and more particularly the holes 44, are focally aligned with the source 12 so that the collimating plates and the holes 44 are oriented to allow radiation passing along a direct path from source 12 to impinge on second detector 42. Radiation that is scattered (deflected from a direct path from source 12) typically impinge on the material of collimator 40 and is absorbed.

The collimator 40, positioned immediately behind the first detector 38, is two-dimensional (2D) and is focally-aligned with the source 12. Moreover, the collimator 40 reduces scatter components 7, resulting from collisions made by primary signals with the object 14, support 16, and first detector 38, from passing through the collimator 40 to the second detector 42. Therefore, collimator 40 significantly reduces scatter components 7, allowing measurement of the primary signals 5 focally-aligned with the collimator 40 and passing through the holes 44. The collimator 40 is explained in further detail with reference to FIGS. 7A, 7B, and 7C.

Positioned immediately behind the collimator 40 is the second detector 42. The second detector 42 preferably comprises an area detector or alternatively a plurality of linear detector arrays, or alternatively one or more discrete detector elements. The second detector 42 measures the collimated signal 6, as explained in further detail herein below.

Figure 3:
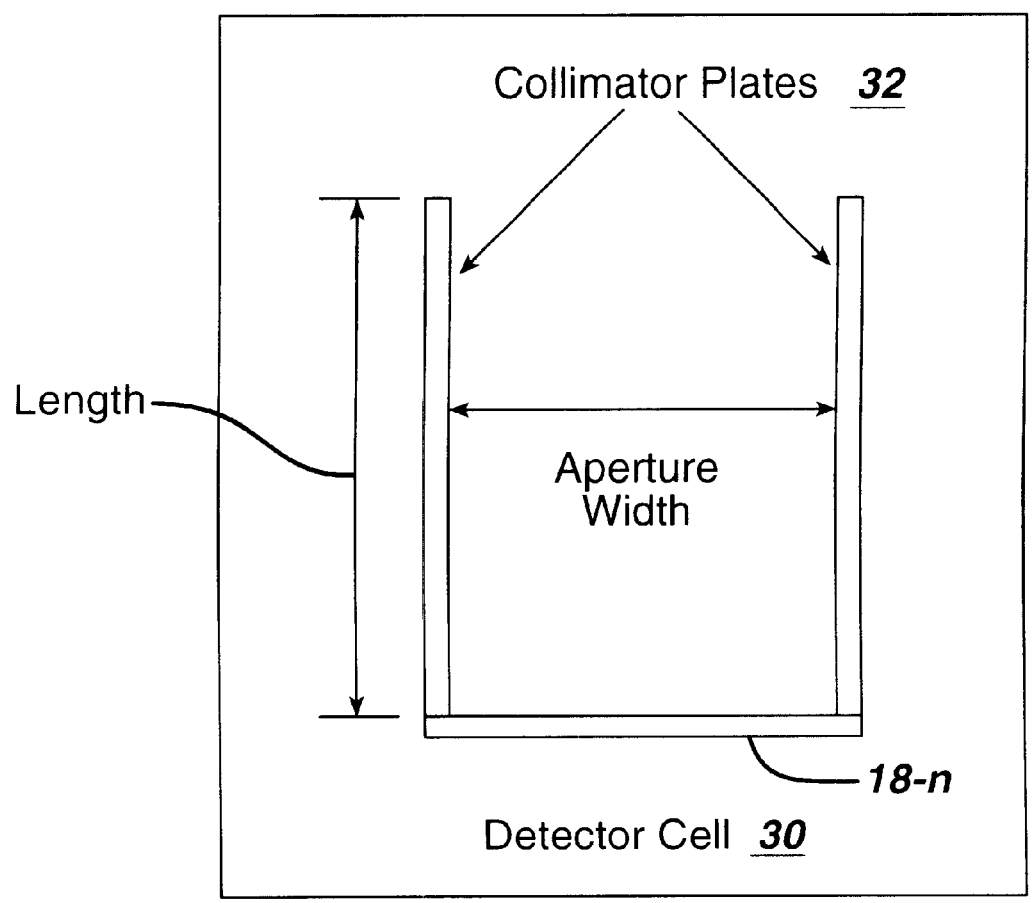
FIG. 3 shows geometry of collimator plates positioned for a detector cell.

FIGS. 7A, 7B, and 7C show a front view, a top view, and a (right hand) side view, respectively, of one embodiment of collimator 40, and, more particularly, show a collimator plate with focally aligned holes. Collimator 40 includes holes 44 focally aligned with x-ray source 12 and provides collimation of the unabsorbed, undetected primary beam 5 in the first detector 38 passing through the hole apertures. To reduce the scatter component signals 7, collimator 40 preferably comprises a solid piece of attenuating material of the same or greater height and width dimensions as the first detector 38 and includes a sufficient number of holes (also referred to as slits or apertures) 44 to sample appropriately the two dimensional (2D) scatter signal 7. Scatter signal 7 has, in general, low frequency spatial characteristics (that is, the scatter is a smoothly varying function and hence does not vary dramatically from point to point with large step-like variations from point to point). Due to this characteristic of scatter, a small number of holes 44 suffice for appropriate estimation of the scatter signal 7 across the first detector array 38. The "small" number of holes refers to a number sufficient to obtain representative data to characterize the scatter, and can be determined, for example, based on empirical measurements or predicted based on Nyquist sampling. Alternatively, collimator 40 comprises collimator plates 32 similar to those shown in the FIG. 3, positioned (in either one or two dimensions) immediately behind the first detector 38, and in front of the second detector 42. This embodiment of the present invention provides For example, collimator 40, by way of example and not limitation, provides 20 cm×20 cm in height and width dimensions, with holes distributed in an equidistant 50×50 matrix. Such sizing provides holes 44 with a large aspect ratio (high ratios imply greater scatter reduction, with the ratio being defined as the depth of the holes 44 divided by the diameter of the holes 44 in the collimator 40), to appropriately reduce scattered primary signals 7. "Appropriate reduction" as used herein refers to reducing the scatter component of radiation incident on second detector so that scatter constitutes 10% or less of the total signal, and desirably 5% or less of the total signal.

Behind the collimator plate 40 in assembly 36, second x-ray detector 42 is positioned to measure the remaining intensity of x-ray flux of primary signal 5, and any residual scatter 7, as collimated signal 6. As used herein, "behind," "above," "below," and the like are used as relative terms for describing positions as illustrated in the drawings. However, since the apertures in the collimator significantly reduce the scatter signal 7, the component of this element of signal 6 is small enough that signal 6 can be deemed to be representative of the primary signal 5 detected in the first detector.

The signal measurements of collimated signal 6 from the second detectors 42 are essentially scatter-free since the collimator slits or holes 44 significantly reduce the scatter signal 7. These data of signal 6 are then used to estimate the 2D primary signal component 5 measured in the first detector 38 at various sample locations across the first detector array 38 corresponding to the sample locations of the signal 6. The estimate of the primary signal 5 in the first detector from the signal 6 measurements is denoted as $E\{P1\}$. This estimate, $E\{P1\}$, is determined by using the measurements of signal 6 and estimating the signal strength of the primary signal 5 in the first detector based on the x-ray absorption in the second detector and the attenuation of signal 5 by the first detector. The method of the present invention, implemented by the scatter estimation and reduction program 25 of the present invention, is explained in detail with reference to FIGS. 8–14.

Generally in the present invention, the estimates of 2D scatter signal 7 denoted as $E\{SC1\}$, are generated by subtracting the estimates of the primary signal P1, demoted $E\{P1\}$ (determined as outlined above), from the total primary plus scatter signal (P1+SC1) measured at corresponding locations in the first detector 38. As used herein, "corresponding locations" and the like refer to portions of first and second detectors that are focally aligned with the apertures in collimator 40 (thereby providing appropriate locations to determine the total signal (on first detector) and the primary x-ray signal on the second detector for rays that passed along a direct path through the same spatial area (which area may be of a size of about 5 or more square pixels). Thus, $E\{SC1\}=P1+SC1-E\{P1\}$, at corresponding locations in the first detector 38. The 2D scatter signal (SC1) estimates, $E\{SC1\}$, are referred to as a sampled 2D map of scatter. The sampled 2D map of scatter is then filtered using techniques known in the art to generate a spatially smooth scatter function by applying the a priori knowledge that the scatter signal SC1 should be spatially smooth or, in other words, contain low-frequency signal components. Alternatively, a polynomial surface is generated and the squared-error between the scatter estimates and the fit to the data are minimized to generate the continuous 2D map of scatter.

To illustrate a simple example of a smooth scatter function (denoted SC1) using the least squared-error technique, consider the case when one wishes to estimate the scatter in a 1D detector with a constant value, i.e. SC1=k where k is the constant to be determined. Assuming estimates of the scatter across the detector array, the squared-error functional E is defined as $\epsilon = \Sigma_i (E_i\{SC1\}-k)^2$ for $i=1 \ldots 10$ Minimizing this equation with respect to k yields $k = \Sigma_i (E_i\{SC1\})/10$ as expected. In other words, the best estimate k is just the average of the estimates of the scatter.

The unknown parameters in more complicated equations used to estimate scatter can be readily ascertained using one of several comparable squared-error techniques known to those skilled in the art. By subtracting the "smoothed" (that is, a low-pass filtered) scatter estimate from each measured signal location in the first detector array 38, the scatter fraction of the signal measured in each detector element of the first detector 38 is significantly reduced. The net benefits of the method of the present invention are improved resolution and low-contrast detectability in reconstructed CT images or radiographic images.

The foregoing method of the present invention is now explained in detail.

FIG. 8 is a flowchart 46 of the scatter estimation and correction method of the present invention, implemented by the scatter estimation and correction program 25 of the present invention.

As shown in FIG. 8, x-ray intensity data is collected 48 by the data acquisition component 19 from the first detector 38 and the second detector 42 of the x-ray imaging system 34 of the present invention. The strength of the primary signal impinging on the second detector (P2) 42 is then estimated 50 from the measurements acquired from the second detector, considering the absorption of the x-ray signal in the second detector 42 at the apertures 44 of the collimator 40; the signal 6 estimate is denoted as E{P2}.

Once E{P2} has been determined, then using this signal, the primary signal 5 is estimated 52 as E{P1} for the first detector 38 at the corresponding aperture locations 44 at which the primary signal P2 is measured; the signal 5 estimate is denoted as E{P1}. E{P1} is estimated by using estimates of the primary signal in the second detector (E{P2}) and the absorption of the x-ray primary signal 5 by the first detector 38.

From the estimate of the primary signal 5, (E{P1 }), the scatter signal SC1 is then estimated 54 for the first detector 38 at locations corresponding to aperture 44 in collimator 40; the estimate of 7 is denoted as E{SC1 }. Then, based upon the scatter signal estimate E{SC1} for respective aperture locations 44, the actual scatter signal 7 is approximated 56 by a smooth function SC1. The smooth function SC1 is then subtracted 58 from the total signal P1+SC1 measured in the first detector 38 at each respective cell location to compensate for the scatter component SC1 in the detected signal in the first detector 38.

That is, the scatter components (SC1) of the total signals (P1+SC1) are reduced based on the detected, collimated signals P2 and the corresponding, detected, total signals P1+SC1.

If the system 34 is a CT imaging device, imaging data is then reconstructed 60 from the signal P1+SC1–SC1, as though these data were measured by the first detector 38 and using techniques known in the art. This reconstruction process involves normalizing the data with respect to the output intensity of the x-ray source 12 measured at each location in the detector 38, taking the natural logarithm of the data, scaling or filtering the data (or both), depending on the geometry of the imaging system 34, and back-projecting the processed data onto the reconstruction grid. This process is known as filtered back-projection and is known to those skilled in the art.

FIGS. 9–14 correspond, respectively, to each of 48–58 of FIG. 8 and illustrate each of steps 48–58 in further detail.

Figure 9:
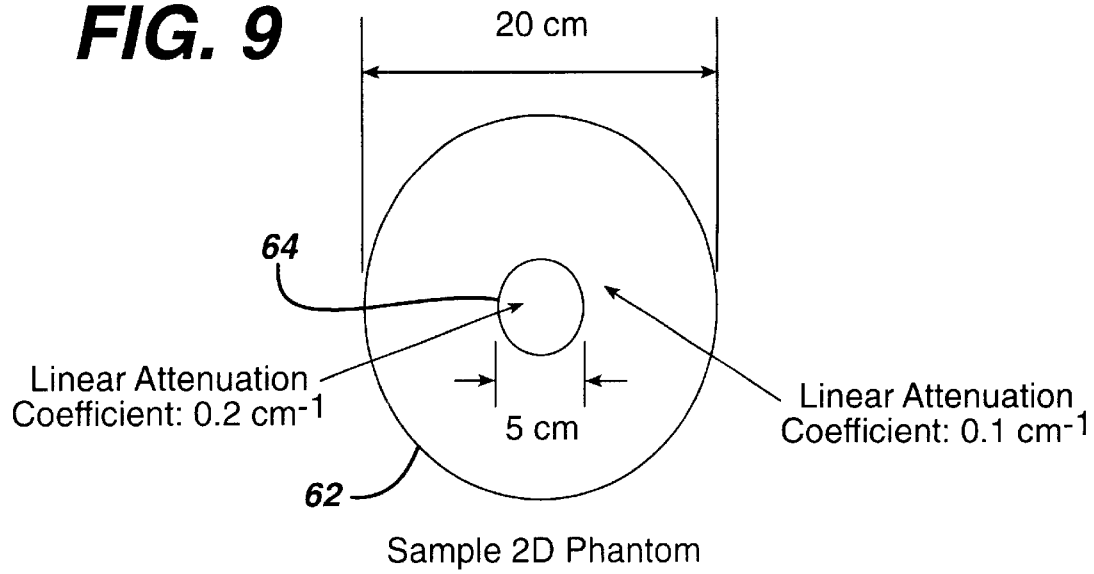
FIG. 9 shows a sample 2-dimensional phantom.

FIG. 9 shows a sample two-dimensional (2D) phantom 62 of a three-dimensional object 14. By way of example and not limitation, the sample 2D phantom 62 is 20 cm. in diameter. Except for a center section 64 thereof, the sample 2D phantom is a homogeneous object with a linear attenuation coefficient of 0.1 cm$^{-1}$. The center section 64, representing the region of inhomogeneity in the sample 2D phantom, has a 5-cm. diameter and a linear attenuation coefficient of 0.2 cm$^{-1}$.

Figure 10:
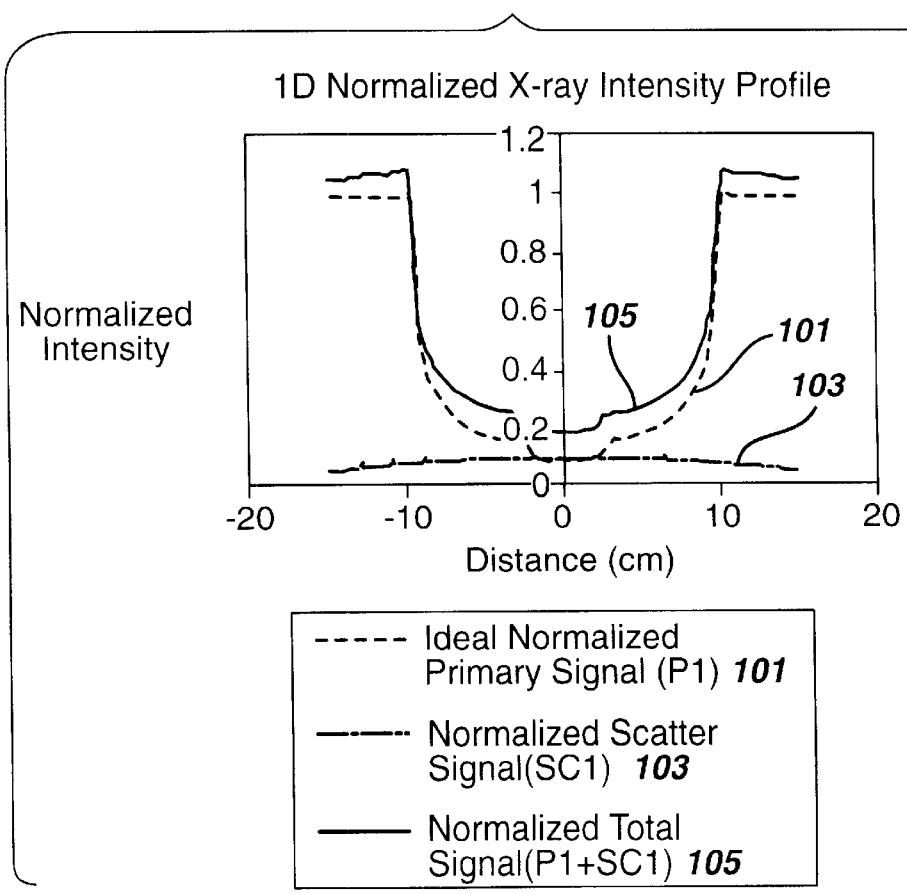
FIG. 10 is a graph of normalized, noise-free x-ray intensity signals measured in a 1D first detector.

FIG. 10 is a one-dimensional (1D), normalized x-ray intensity profile of noise-free signals 5, SC1, and P1+SC1 detected by the first detector 38. The respective intensities of an ideal normalized primary signal 5, a smooth scatter signal SC1, and a normalized total signal P1+SC1 detected by first detector 38 are shown with respect to the distance in cm. from the center of the 2D phantom image 62 of FIG. 9. FIG. 10, corresponding to 48 in FIG. 8, demonstrates that the normalized total signal measured in the first detector 38 includes the primary signal P1 and the scatter signal SC1 which, when removed, leads to signal P2 measured in the second detector 42 when the attenuation of the primary beam P1 with the first detector 38 is appropriately modeled.

The normalized intensity profiles shown in FIGS. 10–14 represent the signal profiles from a parallel beam x-ray source that are available for detection by detector/collimator/detector assembly 36 of the present invention, and not the absolute x-ray intensity values available for detection. The first detector 38 will absorb some of the energy of these signals, and, ideally, the second detector 42 will absorb the remaining portion of the energy so that the dose to the patient is not wasted. Also, in all of FIGS. 10–14, the horizontal axis shows the distance in cm from the center of the 2D phantom 62 in FIG. 9. For example, the attenuation of an x-ray P1 passing through the center of the phantom 62 is shown at horizontal position 0.0 cm. in the plots in FIGS. 10–14. The attenuation of an x-ray P1 passing through the edge of the inhomogeneity 64 of phantom 62 in FIG. 9 is shown at horizontal position +2.5 cm. and ¥2.5 cm. since the phantom 62 in FIG. 9 is symmetric with respect to the ray P1 passing through its center. As a further example, the ideal normalized primary signal P1 in FIG. 10 is not attenuated in the horizontal regions greater than 10.0 cm. and less than –10.0 cm. since the 2D phantom does not extend beyond these bounds.

Figure 11:
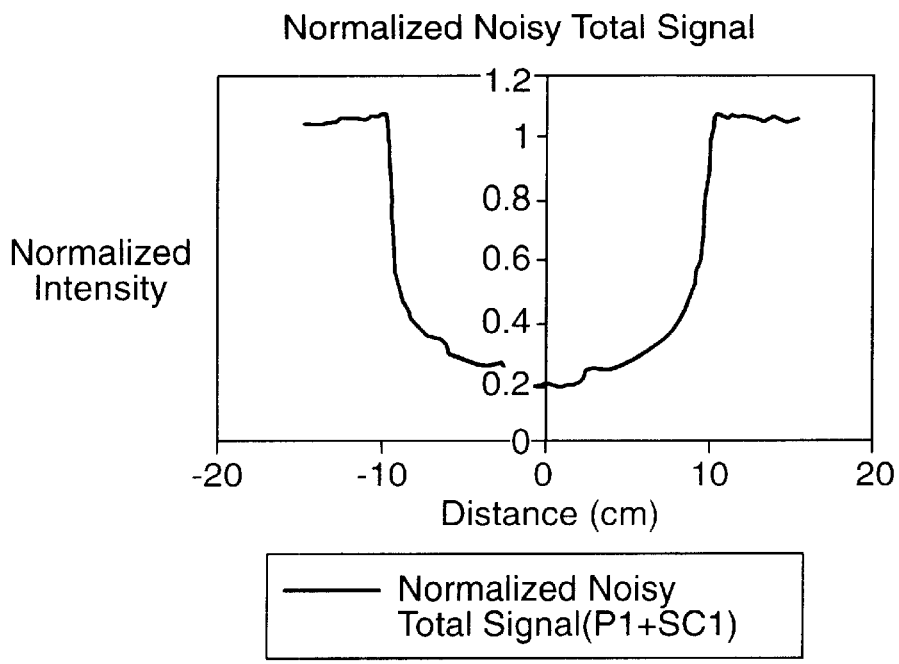
FIG. 11 is a graph of a normalized noisy total x-ray intensity signal measured in a 1D first detector.

FIG. 11, corresponding to 48 of FIG. 8, shows the normalized, noisy (non noise-free), total x-ray intensity signal P1+SC1 measured in the first detector 38 in one dimension.

Figure 12:
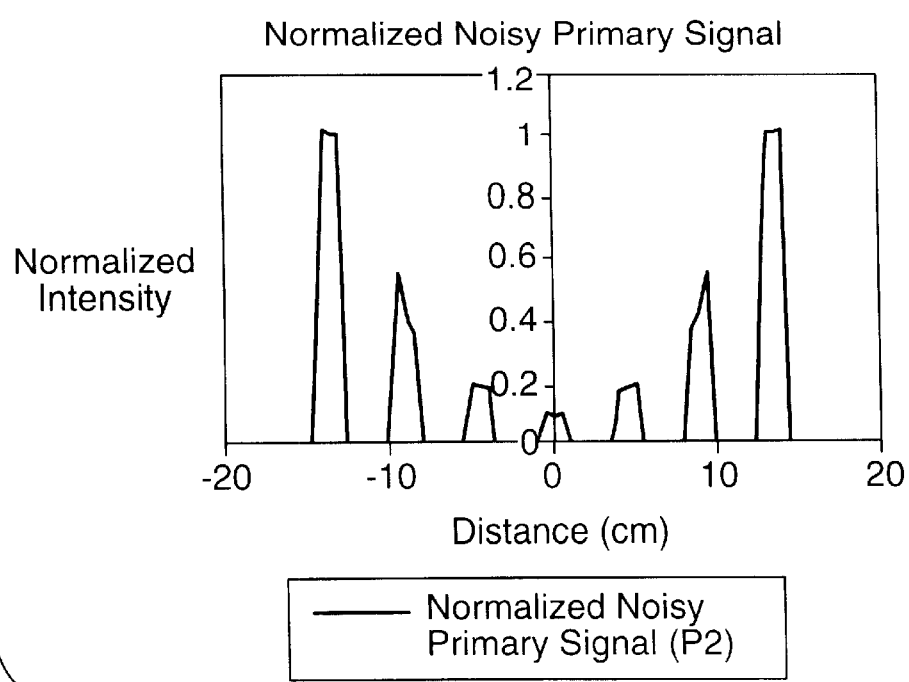
FIG. 12 is a graph of a normalized noisy primary x-ray intensity signal measured in a 1D second detector of the present invention.

FIG. 12, corresponding to 48 of FIG. 8, shows the normalized noisy primary signal P2 measured in the second detector 42 in one dimension.

Figure 13:
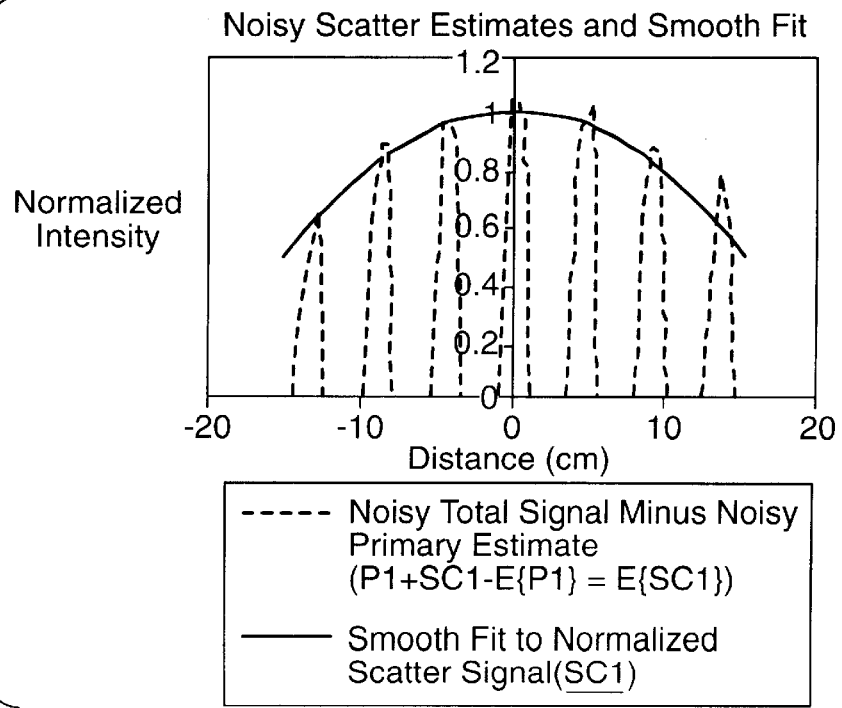
FIG. 13 is a graph of a noisy scatter estimate in the 1D first detector and a smooth fit to a scatter profile, of the present invention.

FIG. 13, corresponding to 50, 52, 54 and 56 of FIG. 8, shows the noisy scatter estimate E{SC1} in the first detector 38, and a smooth fit SC1 to the scatter profile in one dimension. The noisy scatter estimate E{SC1 } is obtained by subtracting the noisy scatter primary signal estimate E{P1 } from the noisy total signal P1+SC1.

Figure 14:
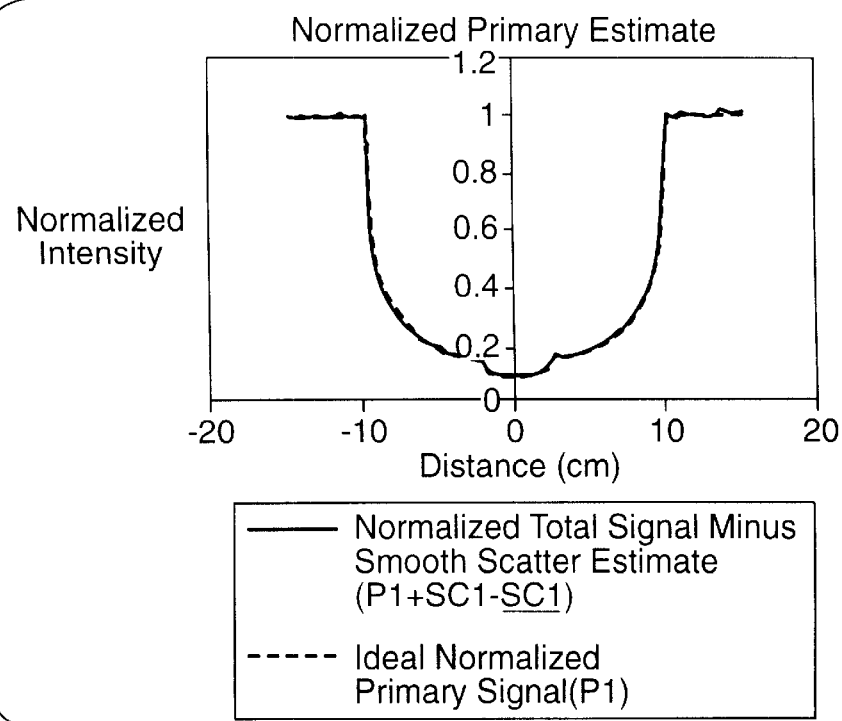
FIG. 14 is a graph of a normalized noisy primary estimate measured in a 1D first detector of the present invention.

FIG. 14, corresponding to 58 of FIG. 8, shows the ideal normalized primary signal P1 and the signal P1 generated by subtracting the smooth fit to the scatter SC1 from the total measured noisy signal P1+SC1.

Another aspect of the present invention, which is a first detector comprising regions of reduced absorption, is now discussed with reference to FIGS. 15A and 15B.

As is well-known in the art, area detectors commonly include scintillation material which absorbs incident rays and converts the energy in the absorbed rays into optical signals corresponding to the energy of the absorbed rays. In a typical prior art detector, typically about 40–45% of the energy in incident rays is absorbed by the scintillation material of the detector.

If a medical X-ray imaging system is optimized for a particular application, the quantum detection efficiency (QDE, referring to the percentage of incident x-rays absorbed by the scintillator material) of the scintillation material included in detectors is desirably at least 90%–95%, and ideally is 100%, which ensures that the total dose delivered to the patient is used for diagnostic imaging, thereby minimizing wasted dose exposure for the patient. Increasing the QDE of the scintillation material is accomplished, for example, by increasing the thickness of the scintillation material. However, as the conversion factor (or QDE) of the scintillation material of improved detectors approaches 100%, the signal-to-noise ratio of the detected signal in the second detector is reduced, making estimation and reduction of the scatter signal more difficult.

In another aspect of the present invention, a selected number of regions 70 are included in the first detector 38 in which the quantum detection efficiency of the scintillation material is not 100%. Using the apparatus and methods of the present invention described herein above with reference to FIGS. 4–14, scatter signals could be estimated and subtracted from the original signal measurements. The QDE of the second detector 42 and first detector 38 should ideally be 100%; hence, the dose delivered to the patient will not be wasted. Once the scatter signal has been estimated and subtracted from the original measurements, the signals measured in the second detector typically are used to improve the signal-to-noise ratio of the primary measurements taken from the detector elements in the 2D detector 38 at the regions 70 of reduced scintillation efficiency. This method reduces artifacts that occur in both radiographs and tomographs because of lower signal-to-noise ratio in measurements at these locations 70. Since scatter is a low frequency signal, it is sufficient for the original 2D detector array 38 to have only a coarse placement of the low QDE regions (or sites) 70 in the scintillation material to adequately sample the scatter signal in the 2D detector array 38. "Coarse placement" refers to having a number of regions 70 to obtain a representative sample given the spatial low frequency variation of the scatter signal.

Figure 15A:
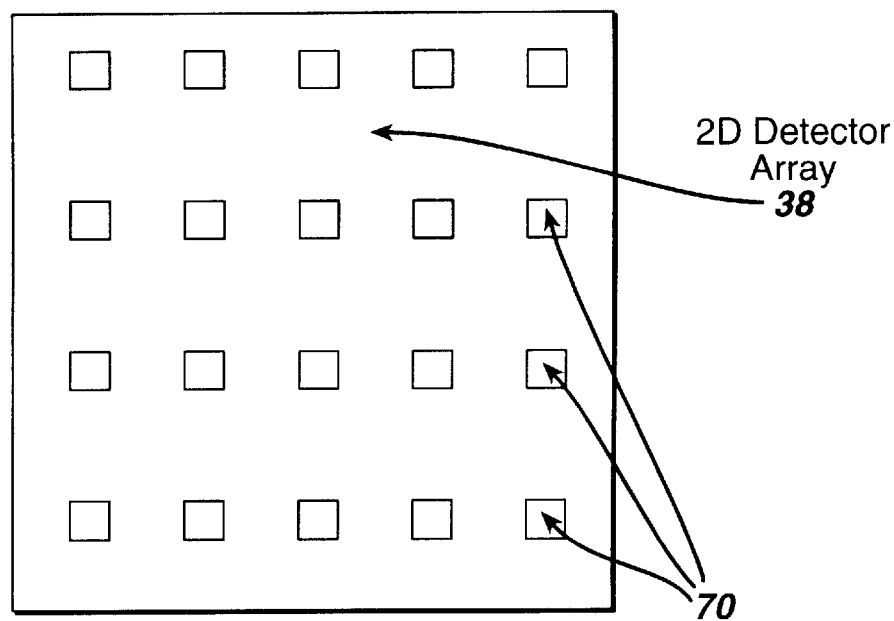
FIG. 15A shows a preferred embodiment of the first detector 38, including regions of reduced absorption 70.

FIG. 15A shows an embodiment of the first detector 38 in which the QDE of the scintillating material of detector 38 approaches 100%, but which also includes regions of reduced absorption 70, preferably placed in a regular pattern (typically referring to an uniform distribution of regions 70 to provide sampling at intervals that provide an accurate representation of the spatially low frequency scatter signal). In regions of reduce absorption 70, the QDE of the material performing the scintillation is approximately 50% (the reduction in scintillator efficacy is application dependent; this figure is used for illustrative purposes only). The absorption power of the scintillating material in the detector 38 is modulated by regions 70. Signals, both primary and scatter, passing through regions 70 of the first detector 38 are then collimated by collimator 40, which preferentially permits the primary signals to pass through the collimator 40. The primary signals that pass through the regions 70 of the first detector 38 and which are collimated by the collimator 40 are detected by the second detector 42 and used by the x-ray imaging system 34 of the present invention as described herein above with reference to FIGS. 4–14, to estimate and reduce the scatter. Since regions 70 absorb approximately 50% of the energy of signals incident thereon, signals passing through regions 70 are relatively easier to estimate, and are of greater integrity, than signals passing through the rest of the scintillating material of detector 38, which absorbs, preferably, 100% of the energy of the signals incident thereon. Regions 70 could be a physical modulation of the scintillating material included in detector 38, or could be a modulation of the physical properties of the scintillating material.

Figure 15B:
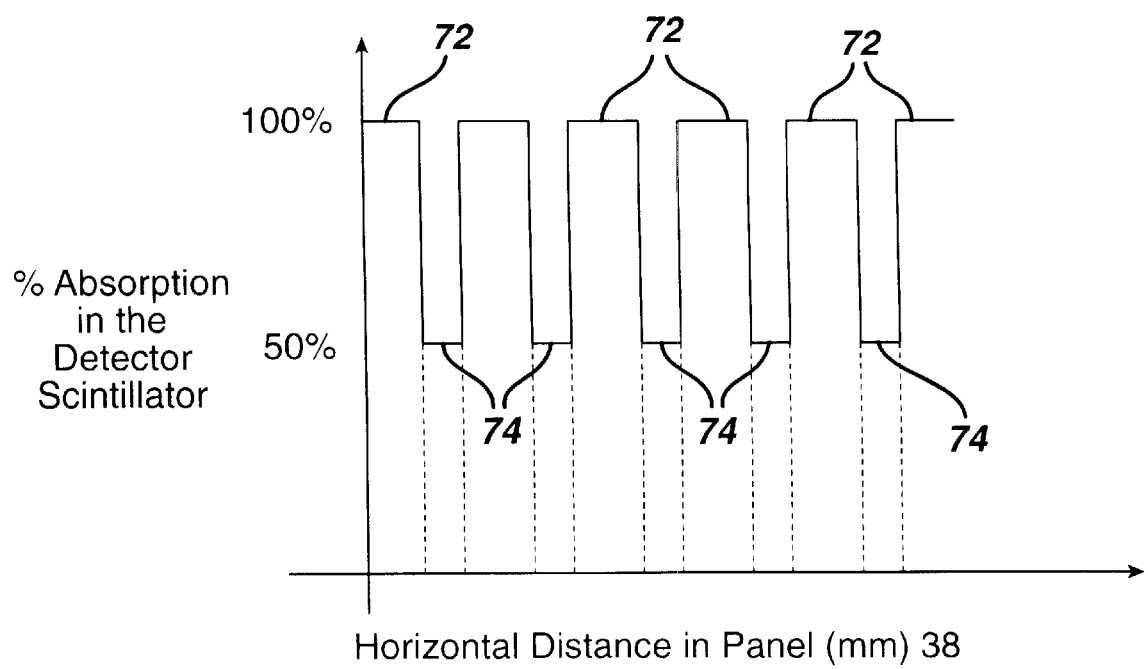
FIG. 15B shows an absorption profile of the preferred embodiment of the first detector 38, which includes regions of reduced absorption 70.

FIG. 15B shows an absorption profile of the preferred embodiment of the first detector 38 with reduced absorption regions 70. At the regions 70 of the detector 38, the scintillating material included in the detector 38 absorbs approximately 50% of the energy included in the rays incident thereto. Peaks 74 correspond to the absorption profile of the regions 70. In contrast, nearly 100% of the energy included in the rays incident to detector 38 is absorbed by the scintillating material of detector 38 at other locations of detector 38 where regions 70 are not located. Peaks 72 correspond to those other regions.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention as claimed.

What is claimed is:

1. An x-ray imaging system for imaging an object by transmitting x-rays, said imaging system comprising a collimator placed between a first x-ray detector and a second x-ray detector, said collimator being disposed so as to reduce scatter components of total x-ray signals incident on said first x-ray detector, said total x-ray signal comprising a primary signal and a scatter signal component such that x-rays incident on said second detector comprise collimated rays representative of direct path x-ray signals passing from an x-ray source through said object to be imaged, through said first detector, and through said collimator; said x-ray imaging system being adapted to generate a scatter correction signal from data obtained from said first detector and said second detector for imaging data generated from said first detector;

said first x-ray detector further comprising a first detector scintillator, said scintillator having a plurality of reduced absorption regions distributed thereon, said reduced absorption regions being arranged to allow transmission of a greater percentage of x-rays there through than other portions of said first detector scintillator;

wherein the collimator collimates the primary signals passing through the reduced absorption regions, and the second detector is disposed to detect the collimated, primary signals passing through the reduced absorption regions.

2. The x-ray imaging system as in claim 1, wherein the x-ray imaging system is adapted to generate a smooth scatter function based upon the scatter correction signal.

3. The x-ray imaging system as in claims 1, wherein the collimator comprises a collimating beam-stop.

4. The x-ray imaging system as in claim 1, wherein the collimator includes holes focally-aligned with an x-ray source of the x-ray imaging system.

5. The x-ray imaging system according to claim 1, wherein said first detector comprises at least one detector module selected from the group of area detectors and linear detectors.

6. The x-ray imaging system according to claim 1, wherein the second detector comprises at least one detector module selected from the group of area detectors, linear detectors, and discrete detector elements.

7. The x-ray imaging system according to claim 1, wherein the x-ray imaging system comprises an x-ray radiography system.

8. The x-ray imaging system according to claim 1, wherein the x-ray imaging system comprises a computed tomography system.

9. An x-ray imaging system comprising:
a collimator disposed between a first detector and a second detector, said collimator being focally-aligned with an x-ray source of the x-ray imaging system, said collimator collimating total x-ray signals passing there through, said total x-ray signals comprising primary x-ray signals passing from the x-ray source and scatter x-ray components generated by deflection of selected ones of said primary x-ray signals that impinge upon an object; and a scatter estimation and reducing program executed by a processor of the x-ray imaging system, said scatter estimation and reducing program receiving data corresponding to the total signals collected by said first detector and data corresponding to the collimated signals collected by said second detector, and reducing the scatter components in the total signals collected by said first detector using the collimated signals collected by said second detector;

said first detector further comprising a first detector scintillator, said scintillator having a plurality of reduced absorption regions distributed thereon, said reduced absorption regions being arranged to allow transmission of a greater percentage of x-rays there through than other portions of said first detector scintillator; wherein the collimator collimates the primary signals passing through the reduced absorption regions, the second detector is disposed to detect the collimated, primary signals passing through the reduced absorption regions, and the x-ray imaging system reduces the scatter components of the total signals detected by said first detector based upon the relationship, in respective regions in said first and second detectors corresponding to apertures in said collimator, between the detected collimated signals in said second detector and the detected total x-ray signal in said first detector.

10. The x-ray imaging system according to claim 9, wherein the collimator comprises a collimating beam stop.

11. The x-ray imaging system according to claim 9, wherein the collimator includes holes focally-aligned with an x-ray source of the x-ray imaging system.

12. The x-ray imaging system according to claim 9, wherein said first detector comprises at least one detector module selected from the group of area detectors and linear detectors.

13. The x-ray imaging system according to claim 9, wherein the second detector comprises at least one detector module selected from the group of area detectors, linear detectors, and discrete detector elements.

14. The x-ray imaging system according to claim 9, wherein the x-ray imaging system comprises an x-ray radiography system.

15. The x-ray imaging system according to claim 9, wherein the x-ray imaging system comprises a computed tomography system.

16. An x-ray imaging system imaging an object and comprising:

an x-ray source transmitting primary signals toward the object;

a detector/collimator/detector assembly disposed with respect to the x-ray source to receive x-rays passing from the x-ray source through the object to be imaged, said detector/collimator/detector assembly being focally-aligned with the x-ray source, said detector/collimator/detector assembly comprising:

a first detector detecting the primary signals passing through the object and scatter components produced when the primary signals strike the object, said first detector further comprising a first detector scintillator, said scintillator having a plurality of reduced absorption regions distributed thereon, said reduced absorption regions being arranged to allow transmission of a greater percentage of x-rays there through than other portions of said first detector scintillator;

a collimator placed opposite from the object with respect to the first detector and collimating the primary signals passing through holes in the collimator, a second detector placed opposite from the first detector with respect to the collimator and detecting the primary signals passing through the holes in the collimator;

a controller coupled to and controlling the x-ray source and the detector/collimator/detector assembly so that the x-ray source and the detector/collimator/detector assembly move in tandem with each other and maintain focal alignment with each other;

a data acquisition component coupled to the detector/collimator/detector assembly and acquiring data of the respective intensities of the signals detected by the first detector and the second detector;

a system computer coupled to and controlling the controller, the x-ray source, and the data acquisition component, said system computer executing a scatter estimation and reduction program estimating and reducing scatter included in the signals detected by the first detector based upon the corresponding primary signals detected by the second detector;

a memory coupled to the system computer and storing the scatter estimation and reduction program; and a display displaying an image based upon the signals detected by the first detector after the scatter is removed therefrom by the scatter estimation and reduction program;

wherein the collimator collimates the primary signals passing through the reduced absorption regions in said first detector scintillator, the second detector detects the collimated, primary signals passing through the regions of reduced absorption, and the x-ray imaging system reduces the scatter components detected by the first detector based upon the detected, collimated signals and the corresponding signals detected by the first detector.

17. The x-ray imaging system according to claim 16, wherein the collimator comprises a collimating beam-stop.

18. The x-ray imaging system according to claim 16, wherein the collimator comprises collimator plates.

19. The x-ray imaging system according to claim 16, wherein the collimator includes holes focally-aligned with an x-ray source of the x-ray imaging system.

20. The x-ray imaging system according to claim 16, wherein the scatter estimation and reduction program constructs a smooth scatter function based upon the scatter components estimated using the primary signals detected by the second detector.

21. The x-ray imaging system according to claim 20, wherein the scatter estimation and reduction program removes the scatter components from the signals detected by the first detector based upon the smooth scatter function.

22. The x-ray imaging system according to claim 16, wherein the first detector is one of a linear detector and an area detector.

23. The x-ray imaging system according to claim 16, wherein the second detector is one of a linear detector and an area detector.

24. The x-ray imaging system according to claim 16, wherein the x-ray imaging system comprises an x-ray radiography system.

25. The x-ray imaging system according to claim 16, wherein the x-ray imaging system comprises a computed tomography system.

26. A method of correcting scatter in an x-ray imaging system in which x-ray signals are detected by a detector/collimator/detector assembly, said method comprising:

collimating total x-ray signals, said total x-ray signal comprising a primary signal component and a scatter signal component, said collimating being provided by a collimator placed between a first detector and a second detector; and reducing scatter components of the total x-ray signals detected by the first detector based on the detected, collimated signals and the corresponding, detected, total signals wherein said first detector comprises- a scintillator, said scintillator having a plurality of reduced absorption regions distributed thereon, said reduced absorption regions being arranged to allow transmission of a greater percentage of x-rays there through than other portions of said first detector scintillator, the step of collimating the total signals comprises collimating the total signals passing through the reduced absorption regions, and the step of reducing the scatter components comprises detecting the collimated signals passing through the reduced absorption regions and reducing the scatter components based upon the detected, collimated signals passing through the reduced absorption regions.

27. The method according to claim 26, wherein the scatter components are reduced by:

collecting x-ray intensity data from said first and second detectors, estimating the collimated primary signals detected by the second detector at aperture locations of the collimator, estimating the primary signals detected by the first detector using the estimated, collimated, primary signals, estimating the scatter signals included in the total signals detected by the first detector at the aperture locations, approximating the scatter signals for the total signals detected by the first detector using a smooth scatter function, and subtracting the smooth scatter function from the total signals detected by the first detector to reduce the scatter components thereof.

28. The method according to claim 27, further comprising reconstructing the image data from the total signals having the scatter components thereof removed.

29. The method according to claim 26, wherein the x-ray imaging system comprises an x-ray radiography system.

30. The method according to claim 26, wherein the x-ray imaging system comprises a computed tomography system.

* * * * *